(No Model.)
A. E. FLATTICK.
MACHINE FOR WEIGHING AND QUILTING FEATHERS.
No. 535,242. Patented Mar. 5, 1895.
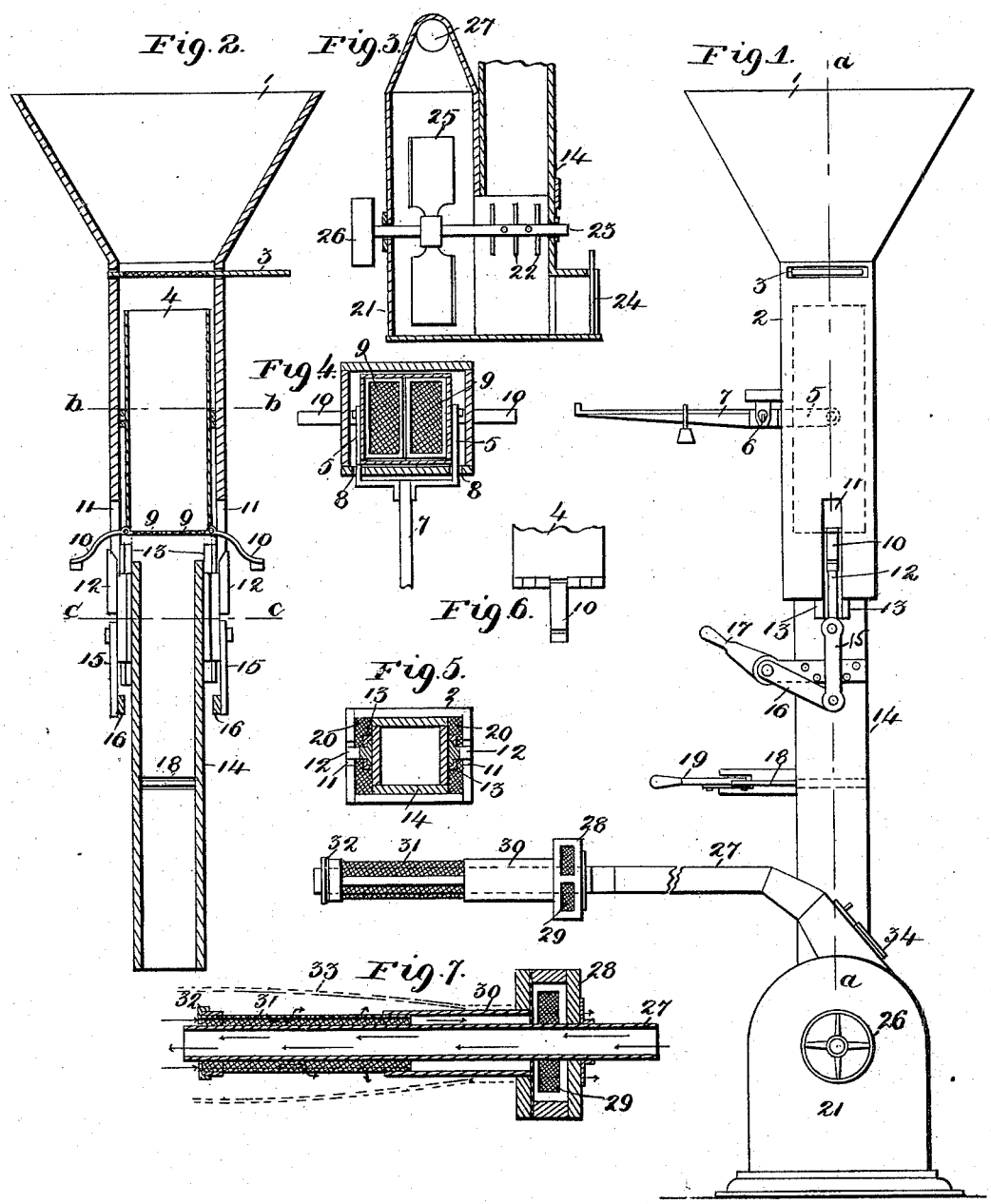
Witnesses
Jno. B. Dempsey
J. T. Spiess
Inventor
Andrew E. Flattick.
By his Attorneys,
Keller & Starek

UNITED STATES PATENT OFFICE.

ANDREW E. FLATTICK, OF ST. LOUIS, MISSOURI.

MACHINE FOR WEIGHING AND QUILTING FEATHERS.

SPECIFICATION forming part of Letters Patent No. 535,242, dated March 5, 1895.

Application filed April 2, 1894. Serial No. 506,001. (No model.)

*To all whom it may concern:*

Be it known that I, ANDREW E. FLATTICK, of the city of St. Louis, State of Missouri, have invented certain new and useful Improvements in Machines for Weighing and Quilting Feathers, of which the following is a full, clear, and exact description, reference being had to the accompanying drawings, forming a part hereof.

My invention has relation to improvements in machines for weighing and quilting feathers and consists in the novel arrangement and combination of parts more fully set forth in the specification and pointed out in the claims.

In the drawings, Figure 1 is a side elevation of the feed chute and parts secured thereto leading to the feed fan. Fig. 2 is a section on the line $a—a$ of Fig. 1. Fig. 3 is a section on a continuation of the line $a—a$ of Fig. 1. Fig. 4 is a section on the line $b—b$ of Fig. 2. Fig. 5 is a section on the line $c—c$ of Fig. 2. Fig. 6 is a detail side view of the pivoted weighted arm projecting from the hinged bottom of the weighing cage; and Fig. 7 is a middle longitudinal section of the tube extending from the feed fan.

The object of the present device is to construct a weighing and quilting machine for feathers which shall be accurate as to its weighing mechanism, will thoroughly exclude the air and thus facilitate the weighing and quilting operations, one that can be accurately adjusted as to the amount of feathers to be quilted, one that prevents the feathers from bunching during the feeding operation, and one which shall present other advantages to be more specifically referred to in the description and pointed out in the claims.

Referring to the drawings, 1 represents a hopper for the feathers leading to the chute 2, a suitable wire gauze valve 3 being interposed between the hopper and chute for temporarily holding the feathers before the same are allowed to drop into the chute. Within the chute 2 is a weighing cage 4 hanging pivotally on the inner ends of the embracing arms 5 leading from the pivotal point 6 of a scale beam 7 secured to the outside of the chute 2, the said arms 5 passing through suitable openings 8 in the wall of the chute as best shown in Fig. 4. The bottom of the cage 4 has two pivoted gauze plates 9 each having an outwardly projecting arm 10 suitably weighted and the chute 2 having suitable cut-away portions 11 to accommodate said arms as the same oscillate up and down with the cage during the operation of weighing. As the cage is weighed down with any predetermined amount of feathers, the arms 10 each come in contact and rest upon the upper edge of a sliding block 12 suitably guided by the confining strips 13 secured to the outer wall of the narrow portion or continuation 14 of the chute 2. The lower ends of the blocks 12 are secured to the links 15 pivotally secured to the operating ends of the arms 16 of the lever 17 as best shown in Fig. 1, the said lever 17 being suitably secured to the narrow portion 14 of the chute 2 in any convenient mechanical manner. As the cage 4 with its pivoted bottom, or rather the arms 10 are resting against the upper edges of the sliding blocks 12, the latter are forced upwardly by depressing the handle 17, and by this action the levers or projecting arms 10 are tilted upwardly, thus tilting downwardly or opening the bottoms 9 to which said arms 10 are secured or of which they form a part. By this action the feathers are allowed to fall from the cage 4 dropping upon the gauze valve 18 confined within the narrow portion 14 of the chute 2, and having an operating handle 19 as best seen in Fig. 1. As the feathers fall from the cage the air at the same time escapes through the perforated gauze strips 20 interposed between the chute 2 proper and its narrow continuation 14 as best seen in Fig. 5. After the feathers are released from the cage 4, the blocks 12 are again depressed by lifting the free end of the handle 17, and the cage now being empty will resume its normal position, the parts being again in place to be operated over again in the same manner. After the valve 18 is withdrawn to allow the feathers to pass, the same fall into the bottom of the blower 21 encountering in their path the pickers 22 mounted on the shaft 23, which prevent the feathers from bunching. The blower is provided with a door or plate 24 which can be opened or withdrawn in case of cleaning of the blower. On the shaft 23 is mounted the fan 25 driven in any manner from the belt wheel 26, which drives the feathers as indicated by the arrows in Fig. 7, through the pipe 27.

Surrounding the pipe 27 at a suitable point is a chamber 28 whose lateral walls are provided with wire gauze 29 for the outward passage of the air. From this chamber and surrounding the pipe 27 extends a sleeve 30 of a diameter to leave an air space between the inner surface of the same and the outside of the pipe 27. From the end of said sleeve extends a wire tube 31 whose free end is retained on the pipe 27 by the perforated cap piece 32 as best seen in Fig. 7. Over the sleeve 30 is passed a quilt 33 (shown in dotted lines in Fig. 7), and as the air and feathers are carried by the fan through the pipe 27, the feathers land in the quilt, and the air escapes by way of the tube 31, between the sleeve 30 and pipe 27, and through the wire gauze walls of the chamber 28 as fully indicated by the return arrows in Fig. 7. A valve 34 is inserted into the pipe 27 near its juncture with the blower so as to vary and regulate the draft or carrying capacity of the current passing through the pipe 27.

Having described my invention, what I claim is—

1. In a feather quilting machine, a fan or blower, a chute leading to the same, means connected to said blower for simultaneously directing and delivering the feathers to a suitable quilt, and means for permitting the air current to return from the quilt and to escape during the filling operation, substantially as set forth.

2. In a feather weighing and quilting machine, a suitable hopper, a chute leading from the same, a weighing cage located in said chute, means for directing and delivering the feathers to a suitable quilt, means for permitting the air to escape from the quilt during the filling operation, and additional means for allowing the air in the passage of the feathers from the cage to escape, substantially as set forth.

3. In a feather weighing and quilting machine, a weighing cage, a hinged perforated bottom for the same, temporary blocks or supports for said bottom, means for elevating said blocks and thus tripping said bottom and allowing the feathers to drop, a chute for said feathers, a suitable blower for delivering the feathers to a quilt, and suitable valves in the path of the chute, substantially as set forth.

4. In a feather quilting machine, a blower, a delivery pipe from said blower, a perforated casing around said pipe, a sleeve secured to the casing or chamber and surrounding the pipe, a gauze or wire tube secured to said sleeve and having a terminal perforated cap piece, to allow the air and feathers to pass in one direction, and permit the air to escape in the opposite direction into the atmosphere, substantially as set forth.

5. In a feather weighing and quilting machine, a main delivery chute, a contracted chute leading from the same, suitable wire gauze located between the outer wall of the narrow chute and the inner wall of the main chute, and a suitable weighing cage in the main chute, substantially as set forth.

In testimony whereof I affix my signature in the presence of two witnesses.

ANDREW E. FLATTICK.

Witnesses:
   JAMES J. O'DONOHOE,
   EMIL STAREK.